Figure 1:
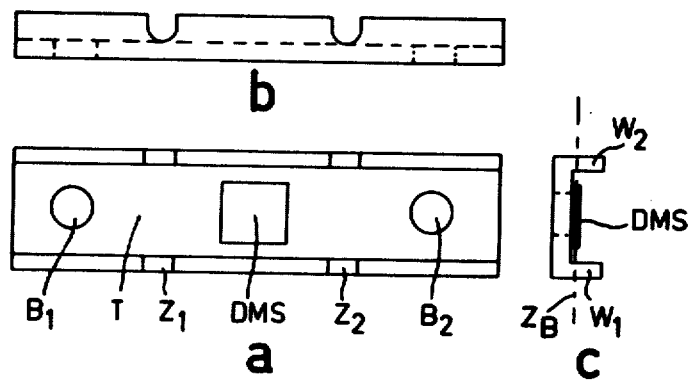

United States Patent

Landvogt

[11] 3,937,075
[45] Feb. 10, 1976

[54] TRANSDUCER COMPRISING STRAIN GAUGES

[75] Inventor: Gunther Friedrich Landvogt, Hamburg, Germany

[73] Assignee: U.S. Philips Corporation, New York, N.Y.

[22] Filed: Oct. 10, 1974

[21] Appl. No.: 513,710

[30] Foreign Application Priority Data
Oct. 16, 1973  Germany............................ 2351810

[52] U.S. Cl.................................. 73/141 A; 338/6
[51] Int. Cl.$^2$............................................ G01L 5/00
[58] Field of Search.......... 73/141 A, 88.5 R; 338/6

[56] References Cited
UNITED STATES PATENTS
3,151,306   9/1964   Hines............................ 73/141 A

*Primary Examiner*—James J. Gill
*Assistant Examiner*—Anthony V. Ciarlante
*Attorney, Agent, or Firm*—Frank R. Trifari; Bernard Franzblau

[57] ABSTRACT

A strain gauge or a bridge comprising four strain gauges is arranged on a support such that the strain gauge(s) is (are) situated in a neutral zone. The support is secured to the object to be measured on both ends, preferably by means of screws. Between the end portions which are screwed down and the central portion accommodating the strain gauges, the support has a zone of low bending rigidity.

The support can be very readily manufactured from a strip of material whose longitudinal sides are flanged so that a U-shaped profile is obtained. Flanges can also be formed only at the centre near the strain gauges, so that the zones of low bending rigidity are automatically formed.

The transducer is intended first of all to be fitted on shafts of existing lorries in order to measure the shaft load.

9 Claims, 2 Drawing Figures

TRANSDUCER COMPRISING STRAIN GAUGES

The invention relates to a transducer comprising at least one strain gauge which is provided on a support, the support being connected to the object to be measured preferably by means of screws located on both ends of the support outside the portion supporting the strain gauges.

Transducers of this kind are used when the direct fixation of strain gauges with glue is not possible or efficient.

In various applications, for example, when the object to be measured is subjected to a bending load, the transducer is not only compressed or strained, but it is also bent. As a result, the strain gauges of the transducer not only indicate the compression or strain, but the bending produces an additional measured value which is superimposed on the actual measured value which is thus in error. It is common practice to provide at least one strain gauge on each side of the support, the said strain gauges being electrically connected such that the errors in the measured values produced during a bending load cancel each other. However, this involves additional costs and, moreover, proper compensation cannot always be readily achieved.

Transducers are already known in which a portion of comparatively weak bending rigidity is present between the fixing location of the support and the strain gauge. For example, U.S. Pat. No. 2,796,503 describes a transducer in which, thanks to the provision of borings and notches in the support between the fixing location and the strain gauge, each time only narrow junctions remain which can no longer transfer substantial bending torques. However, this is achieved only by a very significant reduction of the cross-section, so that when an axial force is applied, a substantial part of the dilatation of the support appears in this area of smaller cross-section. As a result the sensitivity of the complete device is substantially reduced. Moreover, the maximum loadability of the transducer is determined by the surface load at this smaller cross-section.

In order to measure the shaft load of lorries, one or two transducers can be provided on the upper side or lower side of the shaft housing by drilling two holes in the shaft housing and by screwing the transducer down at this location. However, it should be taken into account that the outer surface of the shaft housing of a lorry is merely that of a rough cast which has not been further finished. Therefore, the fixing location is liable to be very irregular so that the transducer is already subjected to a substantial bending load when it is mounted on the shaft housing. Furthermore, it is not sure, notably when the transducer is fitted at a later stage, that the borings for fixing the transducer are made exactly perpendicular to the surface, which could cause additional bending loads.

An object of the invention is to provide a transducer comprising strain gauges which has a simple construction and which notably comprises strain gauges on only one side, the measured value, however, being affected as little as possible by a superimposed bending load.

This object is achieved according to the invention in that the strain gauges are provided in a neutral zone of the support, i.e. a zone in which substantially no tensile forces or compression forces occur when the support is bent, and in that between each end of the support to be fixed and the central portion of the support supporting the strain gauges a zone of lower bending rigidity is provided without a substantial reduction of the support cross-section. The support for transducers thus constructed can be made of a flat strip of material which is flanged upwards along the longitudinal sides so that it can be very advantageously manufactured.

Embodiments of the device according to the invention will be described in detail hereinafter with reference to the accompanying drawing in which:

FIG. 1a, b and c show a side elevation, a plan view and a front view respectively of a transducer according to the invention;

FIG. 2a, b and c show a further embodiment, again in a side elevation, plan view and front view, respectively, which can be very readily manufactured.

FIG. 1 shows a transducer in which a set of four strain gauges DMS, assembled in known manner to form a complete bridge, is connected on a support T. The support T is provided with two borings $B_1$ and $B_2$ via which the support can be fixed on the object to be measured, for example, by means of screws. This transducer serves to measure a tensile force or compression force which acts in the direction of the axis passing through the two borings.

If, as already stated, the transducer is to be fitted on the shaft of a lorry at a later stage, the fact is to be taken into account that the surfaces at the area of the borings $B_1$ and $B_2$ are not situated in the same plane due to irregularities on the shaft housing of the vehicle, the surface of which is usually not treated after coating. This cannot be compensated for by the insertion of washers between the support T and the shaft housing. It is also to be taken into account that the borings in the housing for the fixing screws of the transducer might not be exactly perpendicular to the surface of the housing. It may also be that the spacing of the borings in the housing is not identical to that of the borings in the support T, so that the screws are necessarily screwed in slightly inclined. In all cases the support T would be bent so that the strain gauge measuring bridge would already supply a signal without the shaft of the vehicle being loaded.

In the embodiment shown, the fact that the strain gauge measuring bridge DMS already supplies a signal when the support is bent is eliminated in that the support has a U-shaped profile comprising two flanges $W_1$ and $W_2$ between which the strain gauges DMS are situated. The profile has been chosen such that the neutral zone $Z_B$ in which no tensile forces or compression forces occur in the case of bending extends exactly through the strain gauges. A profile of this kind can be readily realized by suitable proportioning of the flanges with respect to the base surface. The flanges $W_1$ and $W_2$ need not be flanged perpendicular to the base surface since a smaller angle is already sufficient if the height of the flanges is chosen to be slightly larger to make the neutral zone $Z_B$ extend exactly through the strain gauges DMS again.

The flanges $W_1$ and $W_2$ are interrupted between the ends of the support T containing the borings $B_1$ and $B_2$ and the central portion of the support on which the strain gauge measuring bridge DMS is secured, with the result that zones $Z_1$ and $Z_2$ are formed in which the bending rigidity of the support is substantially reduced.

If the support T is bent under unfavorable mounting conditions, the greatest part of the bending by far is thus taken up by the support in the zones $Z_1$ and $Z_2$ of lower bending rigidity, while the intermediate portion accommodating the strain gauges DMS is hardly bent at all. Moreover, this residual bending cannot influence the strain gauge either because the profile has been chosen such that the strain gauges are situated in the neutral zone.

Figure 2:
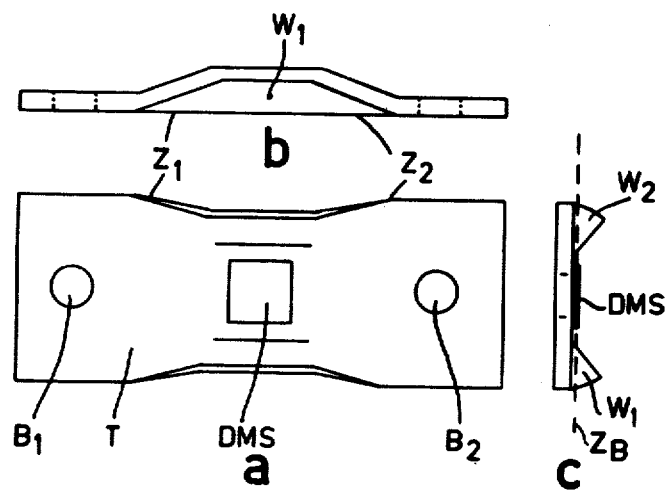

An embodiment of the device according to the invention which can be readily manufactured is shown in FIG. 2. The support again consists of a rigid piece of flat material. However, in this case the long sides of the strip are flanged only at the area of the strain gauges DMS to form the flanges $W_1$ and $W_2$. This can be very readily realized in a single operation, while this embodiment can still offer the same advantages as that shown in FIG. 1. The flanging at the area of the strain gauges DMS produces a particularly rigid support section. At the zones $Z_1$ and $Z_2$ where the flanged parts terminate, however, the support can be readily bent. This low bending rigidity extends as far as the area of the borings $B_1$ and $B_2$ in this case, but a high bending rigidity is actually not required at the area of these borings. If the width of the support is chosen to be substantially equal to the diameter of the fixing means, notably of the screwhead, the bending rigidity of the support at the fixing areas is already enhanced. Such a relationship between the width of the support T and the dimensions of the fixing means is also advantageous for the embodiment described with reference to FIG. 1.

The embodiment described with reference to FIG. 2 offers a further advantage in that variations of the cross-section are completely avoided therein. When the support is subjected to a tensile force, the areas of smaller cross-section are stretched comparatively further than the areas of larger cross-section, so when the strain gauges DMS are provided at an area of larger cross-section, the effect on the indication sensitivity is reduced. Furthermore, the maximum loadability of the transducer is determined by the area of smaller cross-section so that the loadings of the support T of the embodiment shown in FIG. 2 can be maximum.

The support is preferably provided with an envelope at least at the area of the strain gauges, for example, by filling the support with a mass of synthetic material in order to protect the strain gauges against mechanical damage. It was found that such a protection does not affect the described properties of the transducer.

What is claimed is:

1. A force-measuring transducer comprising, an elongate support member having a neutral zone in an area intermediate the ends of the support member at which substantially no tensile or compression forces occur when the support member is subjected to a bending force, at least one strain gage engaging a surface portion of the support member at said intermediate area of the support member, means located at both ends of the support member and outside said intermediate area for securing the support member to an object to be measured, said support member including first and second zones of lower bending rigidity than exists at said intermediate area and provided without a substantial reduction of the support member cross-section, said first and second zones being located respectively between the securing ends of the support member and said intermediate area at which the strain gage is positioned.

2. A transducer as claimed in claim 1 wherein the intermediate area is located at the central portion of the support member and the width of said central portion is at least substantially equal to the width of the support member securing means.

3. A transducer as claimed in claim 1 wherein the support member comprises a strip of flat material having flanges along the longitudinal sides.

4. A transducer as claimed in claim 3, wherein the flanged portions have been substantially removed in the zones of lower bending rigidity.

5. A transducer as claimed in claim 3, wherein the flanges are located along the longitudinal sides of the support member only at the central portion thereof.

6. A transducer as claimed in claim 1 wherein the support member includes longitudinally extending flanges along the sides of the support member, said flanges having recesses therein to form said first and second zones of lower bending rigidity.

7. A transducer as claimed in claim 1 wherein the support member includes flanges along the longitudinal sides thereof located only at said intermediate area of the support member.

8. A transducer as claimed in claim 1 wherein said support member comprises a flat member with flanges along the long sides and said securing means comprises holes in the support member extending perpendicular to the surface engaging the strain gage.

9. A transducer as claimed in claim 1 wherein the support member is preformed from a flat strip of material with longitudinal flanges and recesses formed in the flanges to produce said first and second zones of lower bending rigidity and in a manner such that the cross-section of the support member is not substantially reduced because of said recesses.

* * * * *